United States Patent
Hawkins (10) Patent No.: US 9,511,721 B1
(45) Date of Patent: Dec. 6, 2016

(54) TOW HITCH RECEIVER BRACKET

(71) Applicant: Gerald G. Hawkins, Kankakee, IL (US)

(72) Inventor: Gerald G. Hawkins, Kankakee, IL (US)

( * ) Notice: Subject to any disclaimer, the term of this patent is extended or adjusted under 35 U.S.C. 154(b) by 0 days.

(21) Appl. No.: 15/093,709

(22) Filed: Apr. 7, 2016

Related U.S. Application Data (60) Provisional application No. 62/169,219, filed on Jun. 1, 2015.

(51) Int. Cl.
*B60R 11/00* (2006.01)
*B60R 11/06* (2006.01)

(52) U.S. Cl.
CPC .......... *B60R 11/06* (2013.01); *B60R 2011/004* (2013.01); *B60R 2011/0052* (2013.01)

(58) Field of Classification Search
CPC .............. B60D 1/52; B60D 1/54; B60R 11/00
USPC ........................................................ 224/404
See application file for complete search history.

(56) References Cited

U.S. PATENT DOCUMENTS

| | | | |
|---|---|---|---|
| 5,016,932 A | 5/1991 | Carter | |
| 6,536,793 B2 | 3/2003 | Sargent | |
| 6,749,094 B1 * | 6/2004 | Dexel | B62D 43/007 224/42.24 |
| 7,055,844 B1 | 6/2006 | Bostedt | |
| 7,661,543 B1 * | 2/2010 | Townsend | B60D 1/52 211/4 |
| 8,469,429 B1 * | 6/2013 | Spronk | B60R 11/00 296/37.1 |
| 2006/0087101 A1 | 4/2006 | Yon | |
| 2006/0243769 A1 | 11/2006 | Lovey et al. | |
| 2008/0011698 A1 * | 1/2008 | Simon | B60R 9/06 211/85.8 |
| 2010/0072240 A1 | 3/2010 | Cornes | |
| 2010/0096347 A1 * | 4/2010 | Theobald | B60R 9/10 211/85.7 |

* cited by examiner

*Primary Examiner* — Adam Waggenspack
(74) *Attorney, Agent, or Firm* — IP Global Patents; Joseph C. Terzo, Esq.

(57) ABSTRACT

A receiver storage device configured to store a hitch receiver device is disclosed. A hinge is configured to mount a bracket within a predetermined position inside the body of a vehicle. This further comprises a bracket having a generally square cross-section configured to securely receive the hitch receiver device, where the bracket comprises a storage assembly positioned on an outer surface of the bracket to receive and store a lug wrench. The bracket comprises a storage assembly positioned on an outer surface of the bracket to receive and store a lug wrench; therefore, the hitch receiver device and the lug wrench are prevented from rolling inside the body of the vehicle.

9 Claims, 7 Drawing Sheets

TOW HITCH RECEIVER BRACKET

CROSS-REFERENCE TO RELATED APPLICATION

This application claims the benefit of and priority to U.S. Provisional Application Ser. No. 62/169,219 filed on Jun. 1, 2015, the entirety of which is hereby incorporated by reference herein for all purposes.

FIELD OF THE INVENTION

The present invention relates to a towing hitch receiver storage device and more specifically relates to a storage receiver bracket.

BACKGROUND OF THE INVENTION

Generally, a tow hitch device is attached to the chassis of a vehicle for towing purpose. The device comprises a hitch pindel or ball mounted on the rear of the vehicle with attaching means. The tow hitch has two different configurations like receiver and fixed-drawbar type. Here, the fixed-drawbar type is a traditional one integrated with the hitch pindel but major drawback is that they are not compatible with all hitch components. Therefore, the receiver type device includes a portion mounted to the frame of the vehicle, which can be adaptable to all hitch accessories.

Most of the trailer hitch receivers are bolted to the chassis of the vehicle. The receiver tubes vary in size and configuration to meet the load and other characteristics. The ball mount also comes in multiple dimensions to make it adaptable for height and towing level variations. Therefore, the hitch receiver unit bolted outside the vehicle consumes more space around the vehicle, which in turn gives inconvenience to the user from going around. In addition, there is a possibility for the user to get hurt during the tow operation as the hitch device attached to the frame may bump the skin. Therefore, the option for the user to make an easy walk around the vehicle is prevented.

Further many hitch receiver devices mounted on the rear outside of the vehicle is always prone to inclement weather conditions, which may lead to improper functioning of the device, and as a result, efficiency of the device and the towing operation will be reduced. Few attempts have been made in the past to improve the positioning of the receiver device in the vehicle. However, most of the cases resulted in poor accessibility of the device for the user.

The hitch receiver may also include wrenches and other fastening members for tightening purpose. In most of the cases, these components roll around inside the vehicle while moving around the corner and creating noise and possible damage to the vehicle. This also creates annoyance to the user. Further, the fastening members and the pin may be misplaced by the user itself during the manual operation and making it economically less significant.

In light of afore mentioned problems and limitations, there exists a need for a tow hitch receiver storage unit to hold wrench and other fastening members and positioned inside the vehicle for ease and convenient use.

SUMMARY OF THE INVENTION

The present invention relates to a receiver storage device configured to store a hitch receiver device comprising a hinge configured to mount a bracket within a predetermined position inside the body of a vehicle. Further, the bracket having a generally square cross-section configured to securely receive the hitch receiver device, where the bracket comprises a storage assembly positioned on an outer surface of the bracket to receive and store a lug wrench. The bracket comprises a storage assembly positioned on an outer surface of the bracket to receive and store a lug wrench, therefore the hitch receiver device and the lug wrench are prevented from rolling inside the body of the vehicle. This unit is positioned inside the vehicle in a secluded place out of the way to keep the device ideally convenient for use whenever needed.

In an embodiment, the storage assembly comprises a set of stud members, a set of wing nuts, and a set of v-shaped fastening members, where the v-shaped fastening members are positioned opposingly with reference to respective vertexes, and supported by the stud member on an inner side of each vertex. Each wing nut is positioned in contact with each v-shaped fastening member to support thereto. In an embodiment, the lug wrench is positioned on a receiving section defined between the vertexes of each v-shaped fastening member, and rigidly supported by fastening the wing nuts. In an embodiment, the lug wrench is a four-way lug wrench removably attached to the bracket using wing nuts.

In one embodiment, the bracket and the hitch receiver device are fabricated in square cross section with identical dimensions and designed to hold a lug wrench with two finger tightened wing nuts and a hitch pin. This further includes a handy tie down to hold accessory items like a can of gas or a bucket of sand using bungy straps. According to the present invention, the receiver storage device and its configuration in the vehicle allows for protection of the device from inclement weather and any external disturbance. Further, thus unit acts as a single storage unit carrying all the hitch components and using it in a very easy and convenient manner. The receiver storage device can be made from variety of materials that are having high hardness and rigidity.

DETAILED DESCRIPTION OF THE INVENTION

Figure 1:
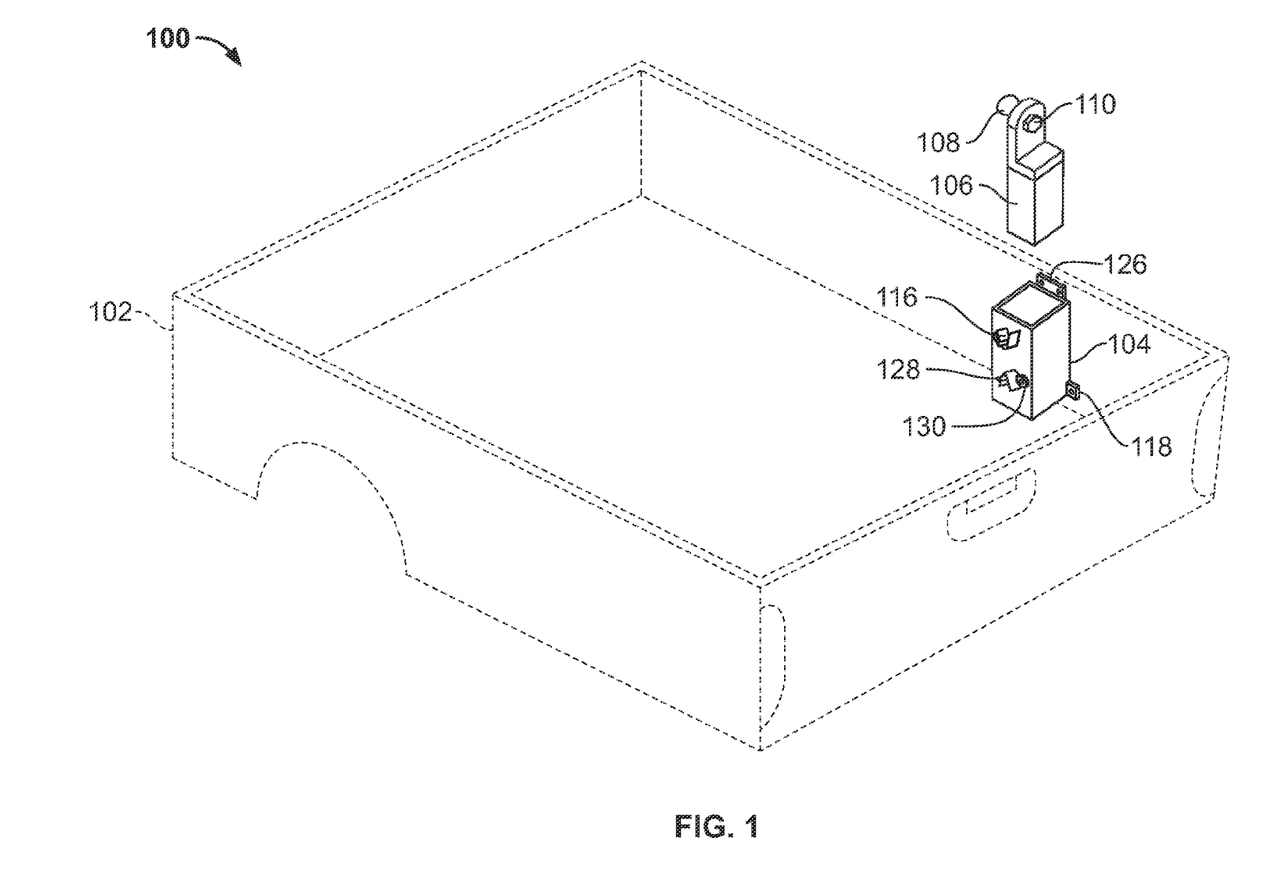
FIG. 1 shows a perspective view of configuration of the receiver storage device positioned inside the vehicle, according to an embodiment of the present invention.

The present invention according to FIG. 1 shows a configuration of the assembly 100 wherein receiver storage device (104, 106) is positioned inside the vehicle 102. The receiver storage device 100 comprises a hinge 126 configured to mount a bracket 104 within a predetermined position inside the body of a vehicle 102. The bracket 104 is configured to have generally square cross-section to securely receive the hitch receiver device 106, where the bracket 104 comprises a storage assembly 129 positioned on an outer surface 104a of the bracket 104 to receive and store a lug wrench 120, therefore the hitch receiver device 106 and the lug wrench 120 are prevented from rolling inside the body of the vehicle 102. Further referring to FIG. 2, in an embodiment, the storage assembly 129 comprises a set of stud members 128, a set of wing nuts 124, and a set of V-shaped fastening members 116, where the V-shaped fastening members 116 are positioned opposingly with reference to respective vertexes 116a, and supported by the stud member 128 on an inner side of each vertex 116a. Each wing nut 124 is positioned in contact with each v-shaped fastening member 116 to support thereto. In an embodiment, the lug wrench 120 is positioned on a receiving section 131 defined between the vertexes 116a of each V-shaped fastening member 116, and rigidly supported by fastening the wing nuts 124.

Figure 2:
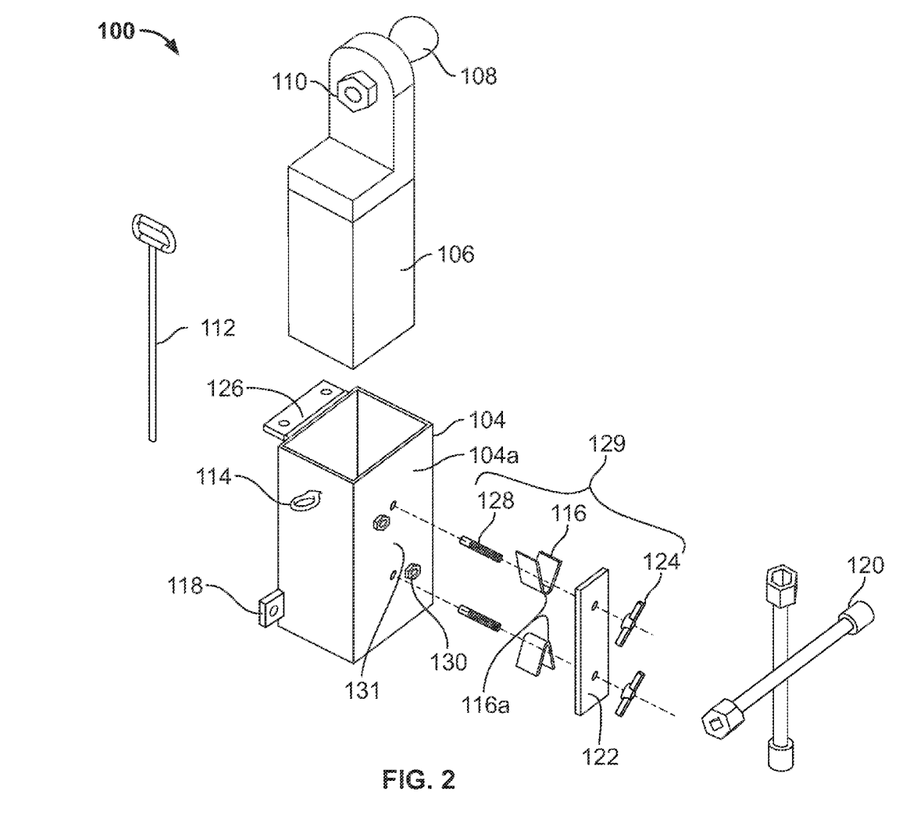
FIG. 2 shows a perspective view of the receiver storage device with hitching components, according to an embodiment of the present invention.

The hitch receiver device 106 mounted in the bracket 104 are positioned in a predetermined orientation inside the vehicle 102 in a secluded place out of the way so that the device is ideally convenient and accessible for use whenever needed as well as protects the unit from any inclement weather. Further, this arrangement prevents the user from getting hurt during the towing setup as the receiver storage device (104, 106) is kept out of the way. The four-way lug wrench 120 is used for tightening purpose is removably attached to the bracket 104 using two finger-tightened wing nuts 124. The orientation of the bracket 104 and hitch receiver device 106 with respect to the vehicle 102 does not allow the lug wrench 120 and other movable components to roll around inside the vehicle 102. According to one embodiment, the lug wrench 120 used is a four-way lug wrench having shape of a cross to meet the different size sockets on each ends. The lug wrench 120 is removably attached to the bracket 104 using V-shaped fastening member 116. These V-shaped fastening members 116 are attached to the bracket 104 as welded joints. The receiver storage assembly 100 is designed in such a way that the square shaped hitch receiver device 106 is fitted with the bracket 104 readily or to switch with the other devices for hitching. However, in additional embodiments, the hitch receiver device 106 and the bracket 104 are configured in a polygonal, square or circular cross section. According to the proposed invention, the user can connect any industrial connecting means easily from the trailer vehicle and fasten it to the hitch pin 108 in the hitch receiver device 106 stored in the bracket 104 and this acts a single unit allowing the user to easily switch with other devices which are designed to go into hitch.

According to FIG. 2, an exploded view of receiver storage device (104, 106) with all the supporting elements is disclosed. A hitch pin 108 is fixed to the hitch receiver device 106 using a nut component 110 and this is an essential component used during the towing of the trailer vehicle. The bracket 104 is designed to hold the hitch receiver device 106 inside the vehicle 102 wherein the hitch receiver device 106 comprises the part of the hitch with the hitch pin 108. The bracket 104 further comprises a supporting frame 118, which is used to fix the bracket to the vehicle 102. Further, the hitch receiver device 106 is attached to the bracket 104 with the help of a hinge 126. The four-way lug wrench 120 is removably attached to the bracket 104 using a V-shaped fastening member 116, two finger tightened wing nuts 124, T wrench support plate 122 and stud members 128 and all these components collectively acts as a hook member for four-way lug wrench 120. This configuration of the four-way lug wrench 120 and the hitch pin 108 integrated with the bracket 104 enables the hitch receiver device 106 to be used as one unit for towing whenever needed and thereby eliminating the need for separate hitch components. Further, the orientation of the hitch receiver device 106 with the vehicle 102 and the welded components to bracket 104 does not allow the hitching components like hitch pin 108, V-shaped fastening member 116 and lug wrench 120 to roll around inside the vehicle 102 whenever the vehicle 102 moves around a corner every time. In additional embodiments, a bungee strap is used as a handy tie down to hold items like a can of gas or a bucket of sand. An annular ring 114 with a support member 112 is provided in the bracket 104 to hold the hitch pin 108 so that it is not misplaced during the operation.

Figure 3A:
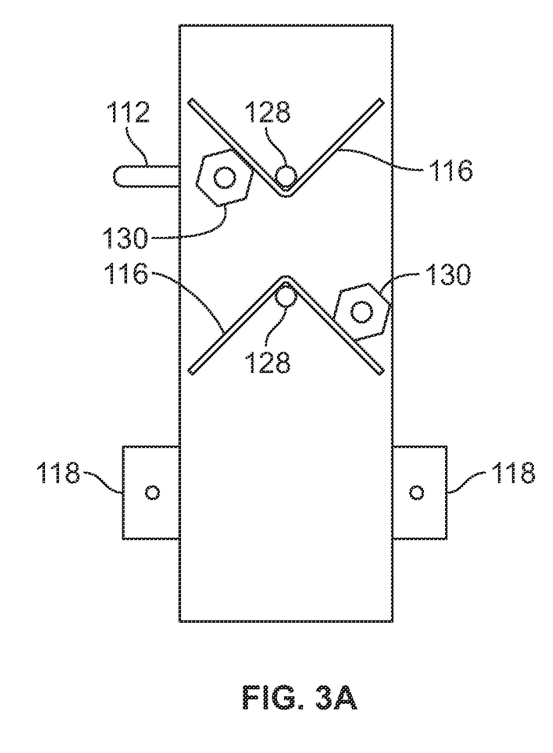
FIG. 3A, FIG. 3B and FIG. 3C shows a front, side and bottom views of the receiver storage device respectively, according to an embodiment of the present invention.
Figure 3B:
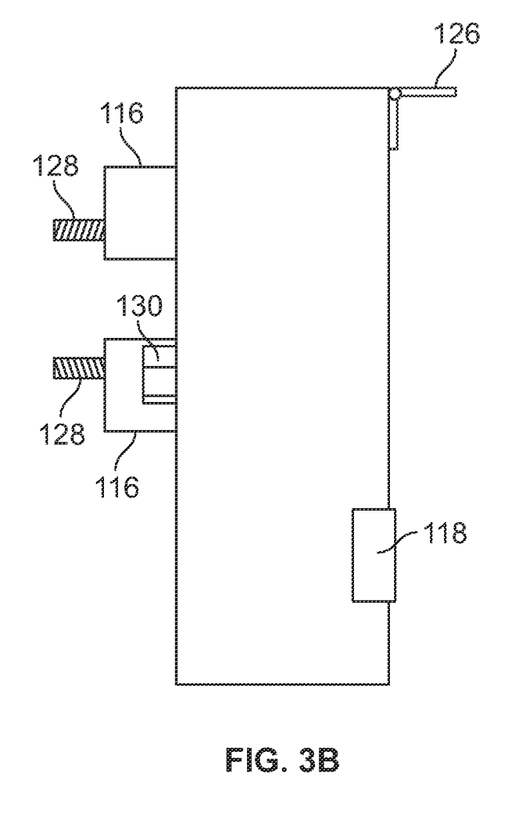
Figure 3C:
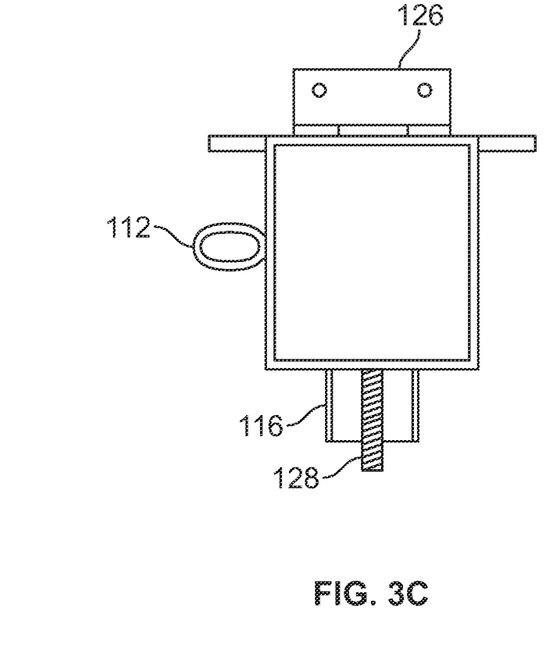
Figure 4:
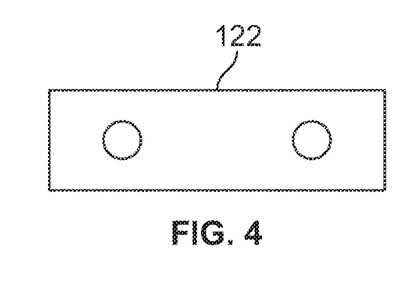
FIG. 4 shows the wrench support plate in the receiver storage device, according to an embodiment of the present invention.
Figure 5:
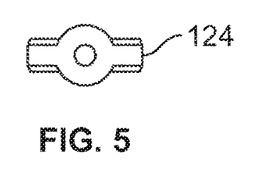
FIG. 5 shows a wing nut in the receiver storage device, according to an embodiment of the present invention.

According to FIG. 3A and FIG. 3B, front and side views of the bracket 104 disclosed. In one embodiment, a method of storing a hitch receiver device 106 is described. As shown in FIG. 3A, a square shaped bracket 104 having a generally square cross-section is fabricated with a nominal thickness and inner section dimensions and mounting a bracket 104 within a predetermined position inside the body of a vehicle 102. The method further comprises securely receiving the hitch receiver device 106 within the bracket 104. As shown in FIG. 3C, the four-way lug wrench 120 and the hitch pin 108 is attached using the V-shaped fastening member 116, stud members 128 and nut 130. Further, a pair of nuts 130 are attached to the bracket 104 and they are spaced away with an offset distance to balance the four-way lug wrench 120. In an exemplary embodiment, the tightening of the four-way lug wrench 120 to the bracket 104 can be accomplished using different type of screw members. As shown in FIG. 3B, the bracket 104 is attached to the vehicle 102 using a support member 118 and this orientation enables the hitch receiver device 106 to be used with ease and convenience by the user whenever needed. Hinges 126 are operably positioned in the bracket 104 for allowing rotation of the device for mounting convenience. As shown in FIG. 4, a flat rectangular wrench support plate 122 is used to fix the four-way lug wrench 120 to the bracket 104. Further, two finger-tightened wing nuts 124 as shown in FIG. 5 are provided in the bracket 104 for removably attaching the four-way lug wrench 120 to the unit.

In an exemplary embodiment, receiver storage device assembly 100 according to the proposed invention can be accomplished in two different models that are varying in dimensions and modified to be used with different towing requirements. For example, the receiver storage device assembly 100 is configured to have 2-inch receiver and a 1 inch and ⅛ receiver that can be leveraged and adapted for numerous towing applications. The receiver storage device assembly 100 can be fabricated from any metallic material having high hardness and rigidity but not limited to hardened steel or carbon steel. However, any other metal of sufficient strength or other suitable material, which accomplishes this function, can be used.

Although the present invention has been described herein in the context of a particular implementation in a particular environment for a particular purpose, those of ordinary skill in the art will recognize that its usefulness is not limited thereto and that the present invention may be beneficially implemented in any number of environments for any number of purposes. Accordingly, the claims set forth below should be construed in view of the full breadth and spirit of the present invention as described herein. Although specific terms may be employed herein, they are used in a generic and descriptive sense only and not for purposes of limitation.

The invention claimed is:

1. A receiver storage device configured to store a hitch receiver device, comprising:

a hinge configured to mount a bracket within a predetermined position inside the body of a vehicle;

the bracket having a generally square cross-section configured to securely receive the hitch receiver device, wherein the bracket comprises a storage assembly positioned on an outer surface of the bracket to receive and store a lug wrench, therefore the hitch receiver device and the lug wrench are prevented from rolling inside the body of the vehicle;

wherein the storage assembly comprises a set of stud members, a set of wing nuts, and a set of v-shaped fastening members; and wherein the v-shaped fastening members are positioned opposingly with reference to respective vertexes, and supported by the stud member on an inner side or each vertex, further wherein each wing nut is positioned in contact with each v-shaped fastening member to support thereto.

2. The receiver storage device of claim 1, wherein the hinge is operably positioned to the bracket, wherein the hinge is configured to allow rotation of the device for mounting convenience.

3. The receiver storage device of claim 1, wherein the lug wrench is positioned on a receiving section defined between the vertexes of each v-shaped fastening member, and rigidly supported by fastening the wing nuts.

4. The receiver storage device of claim 1, wherein the lug wrench is a four-way lug wrench removably attached to the bracket using wing nuts.

5. The receiver storage device of claim 1, further comprising a supporting frame for securely attaching the bracket to the body of the vehicle.

6. The receiver storage device of claim 1, wherein the bracket comprises a handy tie down to hold accessory items.

7. The receiver storage device of claim 1, wherein the bracket is fabricated from a metallic material comprising high hardness and rigidity.

8. The receiver storage device of claim 1, wherein the bracket further comprises an annular ring attached on the outer surface of the bracket to securely hold a hitch pin.

9. The receiver storage device of claim 1, wherein the bracket comprises a fastening member selected from the group consisting of a bolt, a stud, a nut, a washer, and a combination thereof.

* * * * *